(12) United States Patent
Bibas

(10) Patent No.: US 12,103,235 B2
(45) Date of Patent: Oct. 1, 2024

(54) ENHANCED 3D PRINTING APPARATUS

(71) Applicant: Charles Bibas, Great Neck, NY (US)

(72) Inventor: Charles Bibas, Great Neck, NY (US)

( * ) Notice: Subject to any disclaimer, the term of this patent is extended or adjusted under 35 U.S.C. 154(b) by 267 days.

(21) Appl. No.: 17/340,047

(22) Filed: Jun. 6, 2021

(65) Prior Publication Data

US 2021/0379833 A1    Dec. 9, 2021

Related U.S. Application Data

(60) Provisional application No. 63/035,062, filed on Jun. 5, 2020.

(51) Int. Cl.
| | | |
|---|---|---|
| *B29C 64/393* | (2017.01) |
| *B29C 64/232* | (2017.01) |
| *B29C 64/268* | (2017.01) |
| *B33Y 30/00* | (2015.01) |
| *B29L 31/08* | (2006.01) |
| *B29L 31/18* | (2006.01) |
| *B33Y 50/02* | (2015.01) |
| *B33Y 80/00* | (2015.01) |

(52) U.S. Cl.
CPC .......... *B29C 64/393* (2017.08); *B29C 64/232* (2017.08); *B29C 64/268* (2017.08); *B29L 2031/08* (2013.01); *B29L 2031/18* (2013.01); *B33Y 30/00* (2014.12); *B33Y 50/02* (2014.12); *B33Y 80/00* (2014.12)

(58) Field of Classification Search
CPC ... B29C 64/393; B29C 64/232; B29C 64/268; B29L 2031/08; B29L 2031/18; B33Y 30/00; B33Y 50/02; B33Y 80/00
USPC .......................................................... 700/119
See application file for complete search history.

(56) References Cited

U.S. PATENT DOCUMENTS

| | | | |
|---|---|---|---|
| 2020/0070247 A1* | 3/2020 | McClelland | .......... B29C 64/153 |
| 2020/0133235 A1* | 4/2020 | El-Tahry | ............ G05B 19/4099 |
| 2022/0055299 A1* | 2/2022 | Jähnicke | ............... B29C 64/268 |

* cited by examiner

*Primary Examiner* — Michael J Brown

(57) ABSTRACT

A beam steering system in which the printhead follows a printpath along a curve, such as printing of a heat exchanger thin walls, typically undergoes errors due to varying beam angles, beam focus and beam speed. The present disclosure provides solutions to error reduction and increases reliability for printing rings and hollow objects related to 3D printing. Accordingly, a wall described by a curve function, may be fabricated using a printhead, which is moved in a print path that keeps the print lines orthogonal to the print path and tangent to the inner center line curve between the outer wall and the inner wall.

9 Claims, 6 Drawing Sheets

ENHANCED 3D PRINTING APPARATUS

APPLICATION

This application incorporates by reference and claims priority to and the benefit of, U.S. Provisional Patent Application Ser. No. 63/035,062 with filing or 371(c) date of Jun. 5, 2020.

TECHNICAL FIELD

The present invention relates to optics scanners as beam directors, Galvanometer beam directors, galvanometer scanners, and, in particular, to a beam steering system for 2D and 3D scanning and printing.

BACKGROUND

In such Galvanometers-based systems, the beam strikes the surface at variable angles, producing poor print quality [see reference https://www.researchgate.net/publication/341388129_Effects_of_galvanometer_laser_scanning_system_on_the_structural_integrity_of_3D_printed_parts.]. The larger the Galvanometer field of view the larger, the print errors. Therefore, the designer can choose to reduce the field of view by limiting the Field Of View (FOV), where the FOV is the angle between the incident beam and the normal to the worksurface.

Galvanometer Scanners (GM) and Polygon Scanners (PM) suffer from FOV problems when the beam of light, incident to the surface, is always changing. As a result, the energy density absorbed by the surface is reduced by at least three causes:
1. Non normal incident beam to the surface reduces the absorbed energy by: $E0*\cos$ (angle_to the normal 8) as per Lambert law as illustrated in FIGS. 1A & 1B where the focused beam diameter 9 is projected on the surface augmented 10.
2. The focus path is on sphere 11, therefore beam enlargement takes place as the beam distance to the work surface is enlarged as the beam moves away from the center to a longer distance 13 where L 14 is the change in beam length. FIG. 2 illustrates how the beam length 13 is changing from 12 when the beam is at the center while the focus stays on a sphere.
3. The beam surface speed changes although the rotational speed is constant causing a reduction in time spent on the surface as $E=P*t$ where P is the Laser power and t the time spent on the test area.

The impact on the FOV related errors translates to absorption of:

$$E0*\cos^4(\text{angle\_to the normal})$$

Using actuators such as an X-Y gantry system or a Robot to carry the printhead can help to compensate for the reduction of the FOV. In a traditional print path 1, as in FIG. 3, the designer needs to take into account stitch lines 3, where the modulator needs to be adjusted to accommodate for the stitch lines 3 in direction 2. This accommodation is in the form of adjusting the energy of the beam not to overheat or underheat the stitch lines 3.

An object of the present disclosure is to provide solutions to reduce error and increase reliability in printing of rings and hollow objects related to 3D printing, where a light beam steering system can be used as a Galvanometer, Beam director or an X-Y gantry system.

SUMMARY

The present invention relates to a beam steering system, such as a beam director or Galvanometer based system, in particular to an apparatus or a method where the printhead follows a printpath along a curve. As an example use of the systems described herein, thin walls of a heat exchanger are printed where the printhead will always be tangent to a wall center.

DESCRIPTION

A beam director for use in 2D and 3D printers, such as the ones disclosed in U.S. Pat. Nos. 9,435,998, 10,046,444 and 10,473,915, which are incorporated herein by reference, comprises a print-head.

One aspect of the disclosure is about eliminating the FOV by moving the printhead in a print path 21 that keeps the print lines 22 orthogonal to the print path 21 This method benefits parts that follow a symmetry around a point or even following a function curve where the printhead is about tangent to the curve.

Figure 1A:
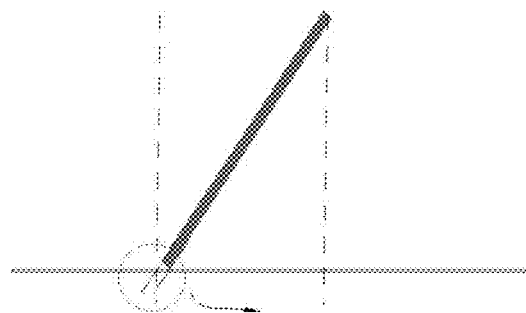
FIGS. 1A and 1B illustrates a conventional angled beam path.
Figure 1B:
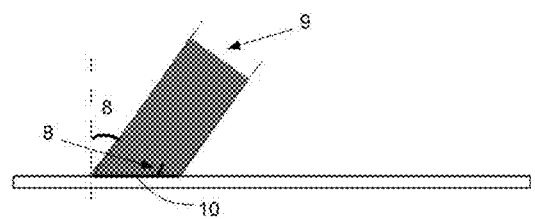
Figure 2:
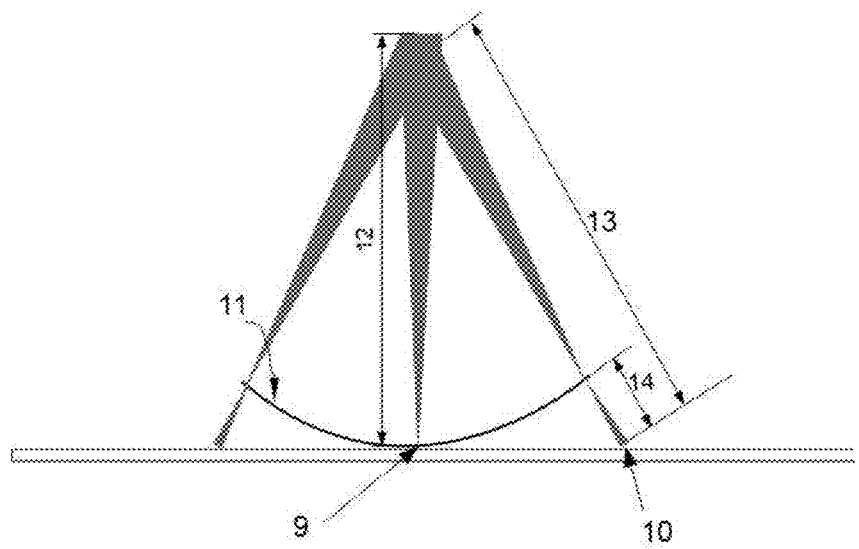
FIG. 2 illustrates a conventional variation in angled beam path.
Figure 3:
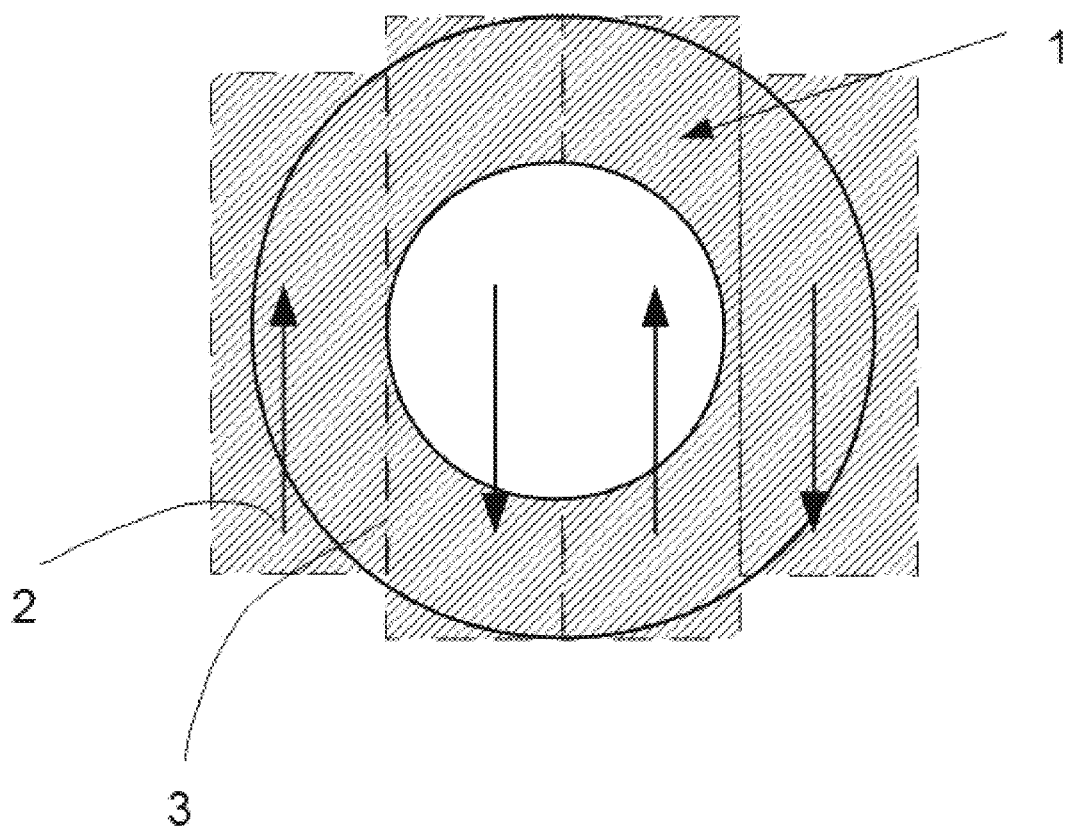
FIG. 3 illustrates a conventional print path.
Figure 4:
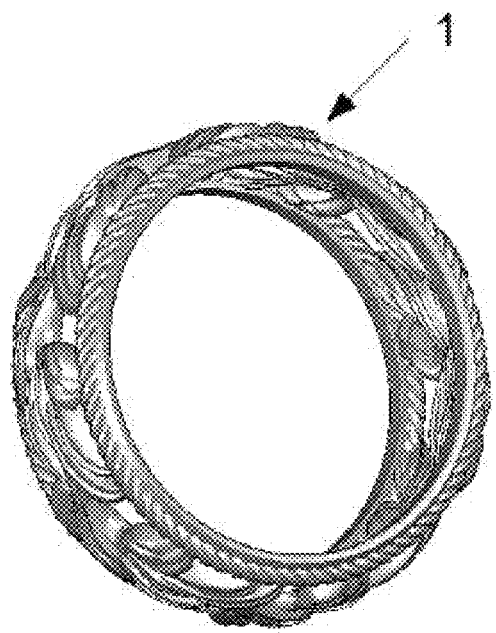
FIG. 4 illustrates a example ring design.
Figure 5:
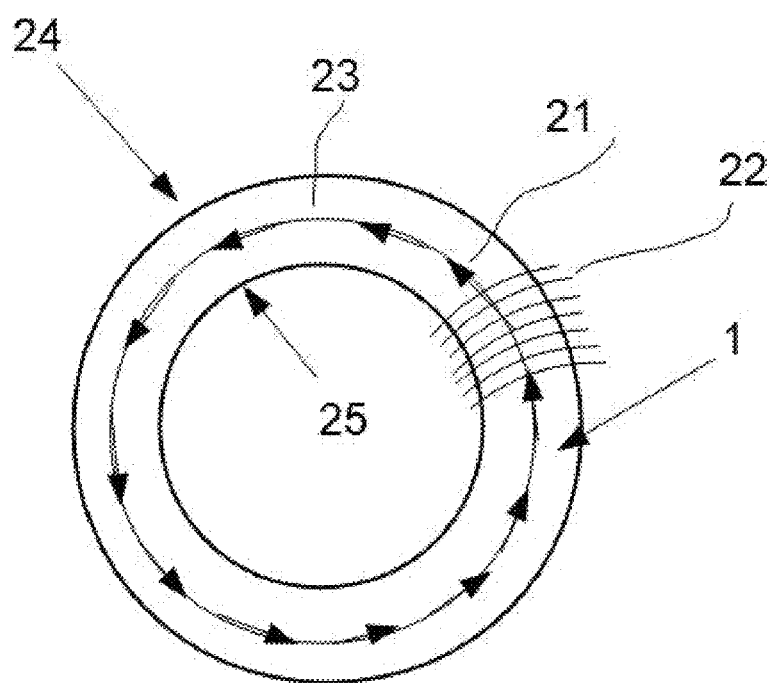
FIG. 5 illustrates a top view of printing of a ring structure where the printhead is always tangent to the centerline of the wall'
Figure 6:
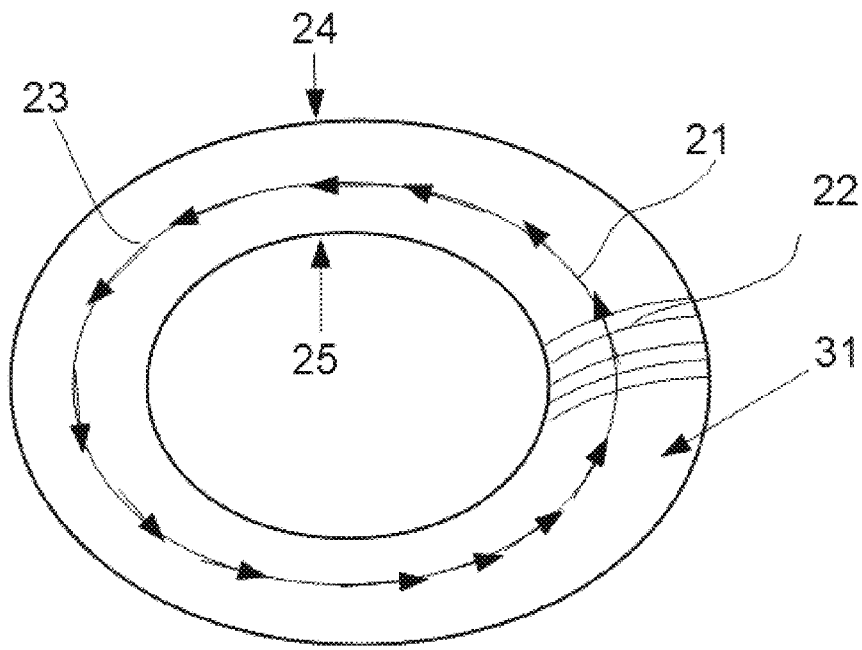
FIG. 6 illustrates a top view of an elliptical ring and print path

As an example, with reference to FIG. 5, when printing a ring 1, as in FIG. 4, the print path 21 is along the inner center line 23 where the print-head is always tangent with the inner center line 23 that is positioned between the outer ring wall 24 and the inner ring wall 25. Similarly when printing an ellipse 31 as in FIG. 6, the print path 21 is following the ellipse circumference where the print path 21 is at the middle of the wall between the outer ring wall 24 and the inner ring wall 25. In fact, any wall, e.g. wall 41 in FIGS. 7 and 8, described by a curve function where the printhead is moved in a print path 21 that keeps the print lines 22 orthogonal to the print path 21 and tangent to the inner center line curve, e.g. inner center line 23, between the outer wall 24 and the inner wall 25 should benefit from this apparatus.

Implementation of this system requires the further processing of the layer following a slicing of the model into layers. Slicing is a process where the 3D model is divided into or represented by a plurality of 2D layers, where each layer is represented by digital information as an image such as svg, jpg, etc. Alternatively, the 2D layer is represented by a G-code where the machine can render the image using machine instructions. The composition of the gcode is instructions for the machine to render the layer which also selects specific paths as how to render it. In general, there are two methods for rendering: raster and vector rendering. In raster, the lines are drawn left to right (e.g. +x, −x) or right to left, then the printhead moves in the orthogonal direction in smaller steps (+y, −y). In vector rendering, the machine follows a function of a curve where the composition of many curves renders the layer.

In the instant application, a print path 21 is selected using the raster method where the print path is selected to move along the inner center of the model walls. This way, the raster lines are symmetrical and orthogonal to the wall center.

When each layer is printed, the printhead follow the printhead print path 21 where the print path 21 is selected to follow wall curves. When a wall 41 is found, then the print path 21 is positioned along the inner center line 23 of the wall 41 so that the print direction is following the wall function so that the printhead prints the print lines 22 orthogonal to the printhead direction in a raster manner.

A simple implementation is by using an x-y gantry system on which the light beam source with the focusing optics is carried. A controller moves the printhead to follow the print path.

Figure 9:
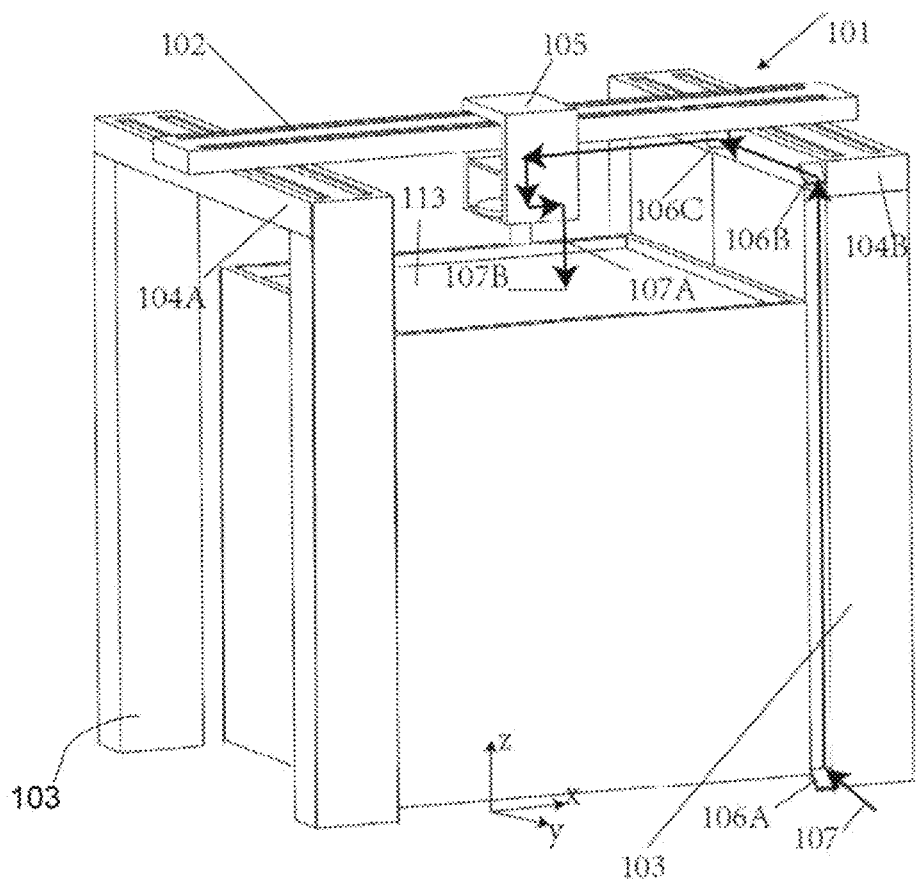
FIG. 9 illustrates a beam director for use in a 3-D printer.
Figure 10:
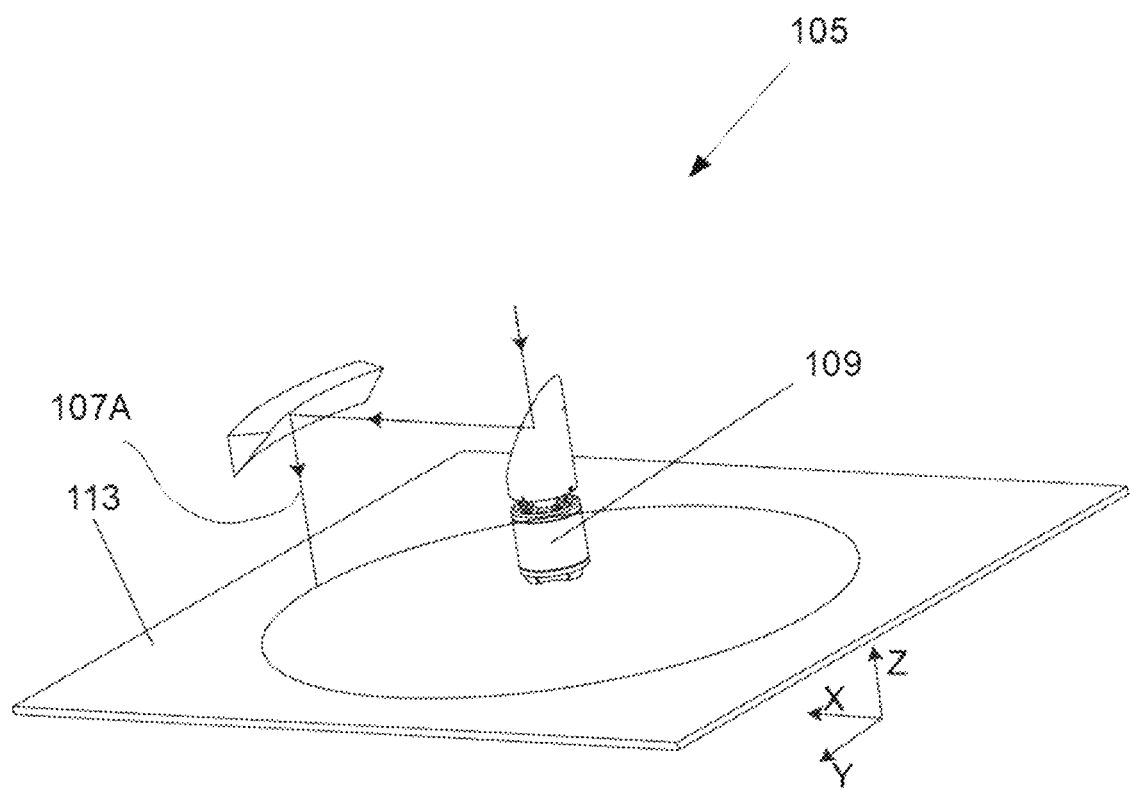
FIG. 10. Illustrates beam director

With reference to FIG. 9 a beam director 105 may be used as a printhead for a three (3-D) printer 101 and is installed on a positioning system of a 3-D printer. The positioning system in this case is an actuator driven X-Y axis gantry system. First y-axis stage 104A and second y-axis stage 104B are both supported by two pillars 103 at their ends. Between the pillars 103, a work surface 113 (the build surface of the 3-D printer) is located.

An x-axis stage 102 may be perpendicular to the first y-axis 104A and the second y-axis stage 104B. The x-axis stage 102 may move back and forth along the y-axis stages 104A and 104B. The beam director 105 may be located on the x-axis stage 102 and may be moved back and forth along the x-axis stage 102 under the control of a processor executing instructions saved on non-transitory memory.

A bottom mirror 106A is located at a foot of one of the pillars 103 and is orientated at an angle towards a top mirror 106B and so configured to reflect a light beam 107 from a light source towards the top mirror 106B which is located towards the top of the pillars 103. The top mirror 106B is configured to reflect the light beam 107 towards an x-axis stage mirror 106C. The X-axis stage mirror 106C is configured to reflect the light beam towards the beam director 105.

It should be appreciated that there are numerous other arrangements of mirrors by which the light beam 107 may be directed towards the print head.

In this embodiment, the beam director 105 is used as a print-head. Therefore, the light beam 107 will be directed towards a third mirror in the beam director.

With reference to FIG. 9, when the light source is activated, the light beam 107 strikes the bottom mirror 106A and is reflected upwards towards the top mirror 106B. The light beam 107 is then reflected towards the x-stage mirror 106C by the top mirror 106B. The X-stage mirror 106C then reflects the light beam 107 towards the third mirror of the beam director 105.

The light beam 107 then follows the path in the beam director 105 until a focusing beam 107A exits the beam director 105 as shown in FIG. 9.

Figure 7:
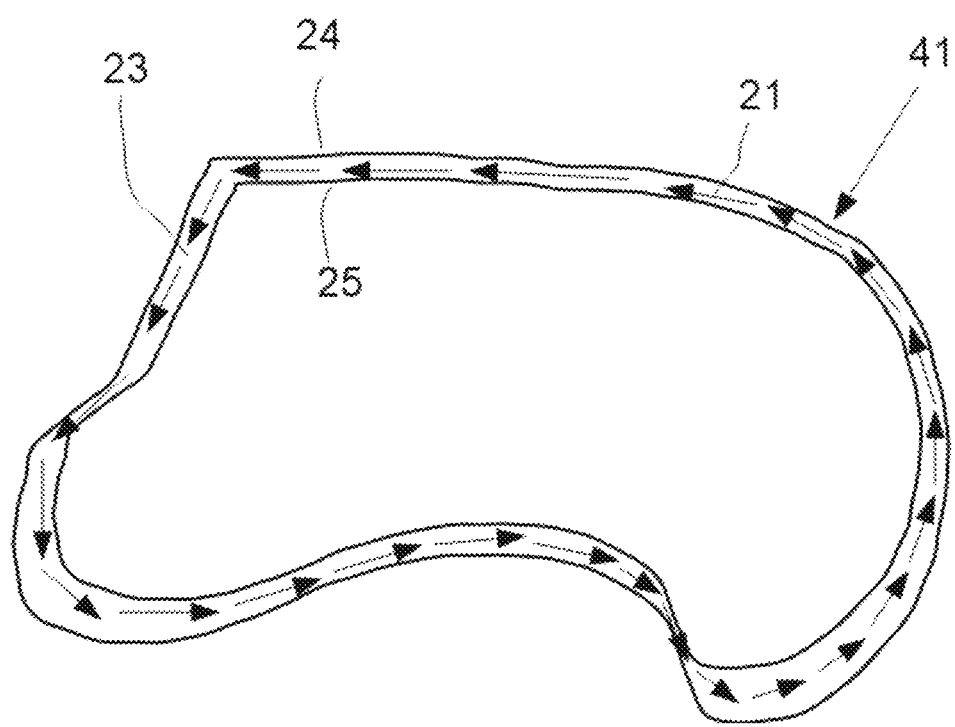
FIG. 7 illustrates a top view of a print path for a random ring structure as a heat exchanger
Figure 8:
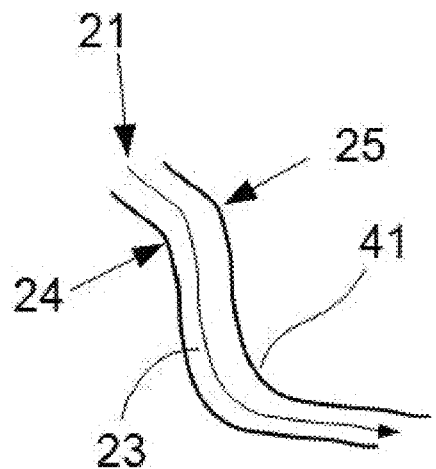
FIG. 8 illustrates a top view of a print path for determining the center line based on center of mass.

Focusing beam 107A strikes the work surface 113 (build surface of the 3-D printer) at point 107B as shown in FIG. 7. Since focused beam 107A is rotated by first mirror 106E the focused beam 107A thus follows a path, e.g. curved or straight, relative to the work surface and traces out a print line 22, e.g. curved or straight, on the work surface 113.

After each rotation of the first mirror by motor 109, the beam director 105 is moved by a beam width in the X-axis direction by the positioning system connected to, and controlled by, the processor. The light beam 107 will now print a new, e.g. curved, print line 22 next to the previous one. This will continue until the end of the object to be printed is reached in the X-axis direction. The beam director 105 will then be moved a width of one curved print line 22 by the positioning system in the Y-axis direction. The beam director 105 will then work its way back in the X-axis direction towards the opposite end of the object to be printed in the X-axis direction. Another aspect of the invention is to move X and Y simultaneously while the print head 105 is printing.

Once again when this end is reached the beam director 105 may again be moved the width of one curved print line 22 in the Y-axis direction and once more move along the X-axis in the opposite direction. This to and fro print action is continued until a whole layer of the object is complete. When the first layer is completed, the work surface (or build surface of a 3-D printer) will be lowered in the z-axis direction by a layer thickness, and a new layer of powder will be dispense over the previously printed layer and the print process will start again for the new layer. The object will therefore be constructed by the printing of subsequent layers on top of each other.

In another aspect of the invention, a Robot can carry the light beam source and optics to print in raster curves where the curves are orthogonal to the printpath.

In a preferred embodiment, a beam director as disclosed in U.S. Pat. No. 9,435,998 is carried by the robot or a gantry xy system where the beam director prints the curves orthogonal to the print path. The advantage of using the U.S. Pat. No. 9,435,998 beam director is that the curves are printed by the beam director, freeing the Robot or Gantry system from printing the raster lines and also increasing the print speed. Therefore, the Robot or gantry XY is used for the slow moving axis along the print path. This will positively impact the Mean Time Between Repairs (MTBF) in addition to providing gains in print speed In a more specific example, a turbine in a size of more than 24" in diameter can be printed by a beam director as disclosed in U.S. Pat. No. 9,435,998 where the only limitation in the turbine size is the robot arm reach.

When printing a turbine model, the slicing algorithm may create print paths 21 for, e.g. turbine, walls where multiple adjacent print paths 21 are created to cover the large size of the walls with concentric print paths 21. The number of concentric print paths 21 may be calculated based on the printhead width. In general, a wall, e.g. turbine, with an outer radius r to be printed with a printhead with a w width. will require at least: r/w print paths 21.

The invention claimed is:

1. An apparatus for fabricating a three-dimensional object including:
   a processor;
   a beam director for steering a light beam from a light source;
   a print head carrying the beam director;
   a non-transitory memory for storing instructions, which, when executed by the processor, cause the processor to:
   slice the three-dimensional object into a plurality of 2D layers;
   select print paths for the print head for each layer;
   compose print lines for each print path for the corresponding layer and orthogonal to the corresponding print path;

while the print head advances one step along its designated print path after each print line, direct the beam director to:

sequentially scan and form each print line.

2. The apparatus of claim 1, wherein the three-dimensional object is selected from a group of: rings, and thin walls.

3. The apparatus of claim 2, wherein the three-dimensional object is a structure with multiple thin walls.

4. The apparatus of claim 3, wherein the three-dimensional object is a heat exchanger or a turbine.

5. The apparatus of claim 1, wherein the beam director is configured to direct the print lines orthogonal to the print path and tangent to an inner center line between an outer wall and an inner wall of the three-dimensional object.

6. The apparatus of claim 1, wherein the print lines are curved.

7. The apparatus of claim 1, wherein one of the curved print paths comprises concentric print paths.

8. The apparatus of claim 1, further comprising a positioning system configured to position the beam director.

9. The apparatus of claim 8, wherein the positioning system comprises an actuator driven X-Y axis gantry system.

\* \* \* \* \*